(12) United States Patent
Kokemohr

(10) Patent No.: US 7,257,269 B2
(45) Date of Patent: Aug. 14, 2007

(54) DIGITAL POLARIZATION FILTER

(75) Inventor: Nils Kokemohr, Hamburg (DE)

(73) Assignee: Nik Software, Inc., San Diego, CA (US)

( * ) Notice: Subject to any disclaimer, the term of this patent is extended or adjusted under 35 U.S.C. 154(b) by 668 days.

(21) Appl. No.: 10/250,438

(22) PCT Filed: Jun. 27, 2003

(86) PCT No.: PCT/US01/50003

§ 371 (c)(1),
(2), (4) Date: Jun. 27, 2003

(87) PCT Pub. No.: WO02/073518

PCT Pub. Date: Sep. 19, 2002

(65) Prior Publication Data

US 2004/0052424 A1    Mar. 18, 2004

Related U.S. Application Data

(60) Provisional application No. 60/258,653, filed on Dec. 29, 2000.

(51) Int. Cl.
G06K 9/00  (2006.01)
G06K 9/32  (2006.01)
G06K 9/40  (2006.01)
G06K 9/54  (2006.01)

(52) U.S. Cl. .................. 382/254; 382/167; 382/296; 382/305

(58) Field of Classification Search ............... 382/167, 382/254, 296, 305, 162, 260; 348/223; 349/5; 350/158; 353/34; 313/493; 396/155
See application file for complete search history.

(56) References Cited

U.S. PATENT DOCUMENTS

| | | | | |
|---|---|---|---|---|
| 3,936,147 A | * | 2/1976 | Murakami | 359/498 |
| 5,124,818 A | * | 6/1992 | Conner et al. | 349/75 |
| 5,416,890 A | | 5/1995 | Beretta | 395/131 |
| 5,489,918 A | | 2/1996 | Mosier | 345/89 |
| 5,541,648 A | | 7/1996 | Udagawa et al. | 348/222 |
| 5,612,738 A | * | 3/1997 | Kim | 348/223.1 |
| 5,838,397 A | * | 11/1998 | Stephens | 349/5 |
| 5,852,343 A | * | 12/1998 | Ravi et al. | 313/493 |
| 6,002,806 A | | 12/1999 | Morikawa | 382/274 |
| 6,016,161 A | | 1/2000 | Robinson | 348/187 |
| 6,088,541 A | * | 7/2000 | Meyer | 396/155 |
| 6,140,997 A | | 10/2000 | Tanaka | |
| 6,672,722 B2 | * | 1/2004 | O'Connor et al. | 353/34 |

OTHER PUBLICATIONS

Publisher'Toolbox, v. 38, pp. 1, 11, 16, 22 (1999).
Publishing Perfection, v. 21, pp. 61 (1999).

(Continued)

*Primary Examiner*—Kanjibhai Patel
(74) *Attorney, Agent, or Firm*—Sheldon Mak Rose Anderson PC; Robert J. Rose

(57) ABSTRACT

A method for simulating in a digital image the effect of a physical polarization filter is described, the digital image having a plurality of pixels (50) with color, by darkening (54) each of the plurality of pixels (52) having a cool color and lightening (56) each of the plurality of pixels having a warm color. Optional adjustment algorithms are disclosed, including a contrast adjustment (62), saturation adjustment (64) and intensity adjustment.

21 Claims, 3 Drawing Sheets

OTHER PUBLICATIONS

Declaration of Nils Kokemohr (Feb. 21, 2006).
Declaration of Michael J. Slater (Feb. 17, 2006).
Supplementary European Search Report, Jun. 6, 2006, EP 01273970.
David F. Farkas, "Out of the Box, Plug-ins Mimic Real-World Lens Filters" Photo Electronic Imaging [Online] No. 42, Sep. 2000, cited in European search report XP002384025.
Jacobson, Ray, Attridge, Axford: "Manual of Photography" Sep. 20, 2000, Focal Press, cited in European search report XP002384028.
Anonymous: "Adobe Photoshop 5.0 User Guide" 1998, Adobe Photoshop 5.0 User Guide, pp. 197-222, cited in European search report XP002292591.
"nik Color Efex Pro Photographic Filters" 2001, Nik Multimedia, San Diego, Hamburg, cited in European search report XP002384029.
nik Color Efex Pro! User Guide, cover and p. 33, color copy of p. 33 of NPL Document 5, XP002384029, 2001.

* cited by examiner

DIGITAL POLARIZATION FILTER

CROSS-REFERENCE TO RELATED APPLICATIONS

The present Application claims the benefit of U.S. Provisional Patent Application 60/258,653 titled "Digital Polarization Filter" filed Dec. 29, 2000, the contents of which are incorporated by reference in this disclosure in its entirety. This Application also claims priority from International Application No. PCT/US01/50003, titled "Digital Polarization Filter," filed Dec. 28, 2001.

BACKGROUND OF INVENTION

This invention relates to the field of digital image processing, and more specifically to a digital surrogate for a photographic polarization filter.

One of the most useful filters in photography is the polarization filter ("physical polarization filter"). The physical polarization filter comprises a piece of treated glass, gelatin, plastic or other substrate disposed in front of a camera lens which allows only light of a certain polarization to pass through to the recording medium, and blocks, or filters out, light with unwanted polarization. Although being key for the physical polarization filter, it is of no further matter for this patent what the polarization of light is. It will be evident to those skilled in the art that the literature on the physics of light or other electromagnetic waves may be referenced for further information.

The physical polarization filter serves basically three needs: (1) it is able to remove reflections, i.e., you can use this filter to photograph the surface of a lake or through a window, without surface reflections (typically the reflection of the sky) and to see what's underneath the surface or behind the window; (2) it is capable of darkening the sky, which is a wanted effect in many photographs; and (3) it creates a different and enhanced contrast, such as crystal-clear colors and a brighter white. Rotation of a physical polarization filter results in varying degrees of these effects, depending upon the relative position of the sun, or other source of polarized light. When rotated to a rotation angle $\theta$ of 90 degrees, the sky darkening effect is at its maximum.

Unfortunately, once a photograph is recorded and it is on film, paper computer, or other recording medium, it is impossible to recover the polarized data out of the image. In other words, it is no longer possible to filter out the light waves of a certain polarization once the recording is taken. It would therefore be very important for digital image editors to have a "digital polarization filter" which simulates most of the effects of a physical polarization filter, since this would enable users to apply a polarization filter after the image was recorded, and to vary the polarization effect to any desired extent. It would also permit digital cameras to add a polarization filter simulation as an image was recorded, even if no physical filter was present.

What is needed is a method to treat the colors of a digital image to simulate the way that the image would look if it had been taken through a physical polarization filter. Such a method, or "digital physical polarization filter," should be able to remove some surface reflections, darken the sky in a desired way, and make the colors and the contrast appear as if the image was taken through a physical polarization filter.

SUMMARY OF INVENTION

This invention meets this need by providing a method to treat the colors of a digital image to simulate the way that the image would look if it had been taken through a physical polarization filter, by removing some surface reflections, darkening the sky in a desired way, and making the colors and the contrast appear as if the image had been taken through a physical polarization filter. A method is described comprising the steps of storing the digital image in a first memory, the digital image comprising a plurality of pixels each having a pixel luminance and a color temperature; transforming each of the plurality of pixels by changing the pixel luminance as a function of the rotation angle $\theta$ and the color temperature; and storing each of the transformed pixels into a second memory.

BRIEF DESCRIPTION OF THE DRAWINGS

These and other features, aspects, and advantages of the present invention will become better understood with reference to the following description, appended claims, and accompanying drawings, where:

DETAILED DESCRIPTION

The method of the present invention is useable as a plug-in supplemental program for a commercially available image processing program, such as Photoshop®, or other software program, or in a stand alone program. The invention is also useable in hardware, such as digital cameras, to simulate the presence of a polarization filter. Optionally, the method may be calculated directly upon a digital image, as will be evident to those skilled in the art with reference to this disclosure. Although embodiments are described with respect to one or more color models, the present invention will be useable in color spaces that contain color, saturation and luminance information.

Figure 1:
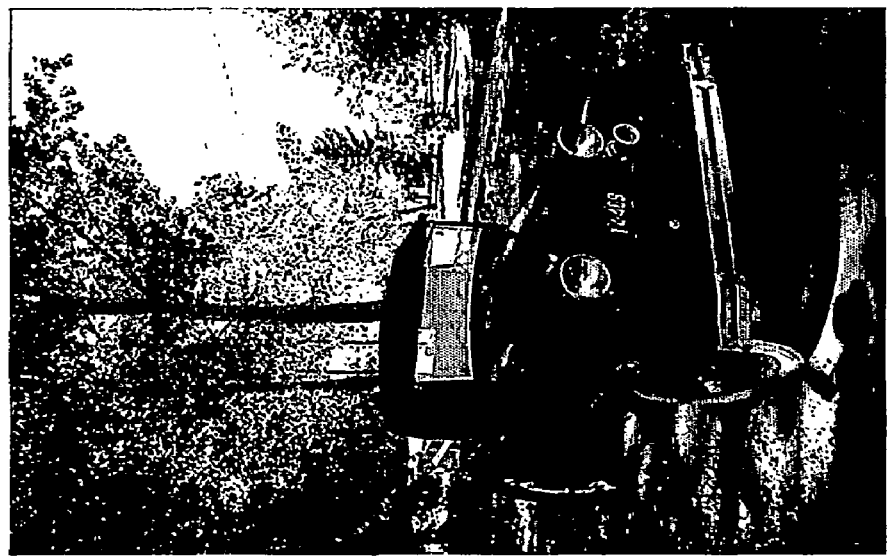
FIG. 1 is a pictorial representation of a digital image.

As will be well understood by those skilled in the art with reference to this disclosure, the operation of the invention is upon a digitized image. The particular means for obtaining the image takes place prior to the start of the method and system described herein; it is assumed that an image, or portion of an image, to be processed in accord with the present invention is present. A sample pictorial representation of a digital image 10 suitable for processing according to the present invention is presented in FIG. 1.

With reference to FIG. 1 through FIG. 4, the method 12 of the present invention therefore begins with digital image 10 with an input matrix 14 of pixels $I_{xy}$ and results in an output image 10' with an output matrix 16 of pixels $I'_{xy}$ which contains the result of the application of the invention. The values x and y in this notation are the actual pixel coordinates in the two-dimensional image.

In a preferred embodiment, the input matrix 14 is stored in a first memory 18 and the output matrix 16 is stored in a second memory 20. This will enable adjustments as described in further embodiments to be made, without destructive changes in the input matrix 14.

In a first embodiment, only one parameter is required to be selected by the user: θ, representing a virtual rotation angle of a polarizer filter, i.e., how much the filter is rotated in front of the camera (this determines to what extent the sky will be darkened and reflections will be removed). The value for θ ranges from 0 to 180 degrees, in order to simulate the range of a physical photographic filter. While values for θ could extend to 360 degrees, no functionality would be gained.

In a further embodiment a factor i, the intensity with which the filter is to be applied, may be added. Of course, the intensity has no analogy to the polarization filter in classical photography, but it's very useful to make the intensity variable. In still further embodiments, it is possible to specify further controls, such as the colors to be darkened.

In one embodiment, input matrix 14 and output matrix 16 contain RGB color space images, i.e., each pixel in $I_{xy}$ and $I'_{xy}$ is a vector of three values (r, g, b) which each range from 0 to 255 (or 65535, if it's a 16 bit image). Optionally, input images may be converted into RGB color space, and then output images can be converted back to other color spaces. Additionally, optionally operation of the invention can take place directly in other color spaces, such as HSB (Hue, Saturation, Brightness), Lab-mode, and CMYK.

In an embodiment where the input matrix 14 contains an image in RGB color space, the notation $I_{xy,r}$ will refer to the value of the red channel of the (r, g, b) pixel which is represented by $I_{xy}$; the notation $I_{xy,g}$ will refer to the value of the green channel of the (r, g, b) pixel which is represented by $I_{xy}$; and the notation $I_{xy,b}$ will refer to the value of the blue channel of the (r, g, b) pixel which is represented by $I_{xy}$.

This method described requires a pixel by pixel calculation for each pixel in $I_{xy}$. As will be evident to those skilled in the art with reference to this disclosure, it will be possible to apply the invention to a sub-set of in the input matrix 14. This might occur, for example, in an image processing program in which the user has selected only a portion of the image for processing. Therefore, henceforth reference to the source pixels is understood to also refer to any user selected pixel sub-set.

Adjusting Warm/Cool Color Contrast

Figure 3:
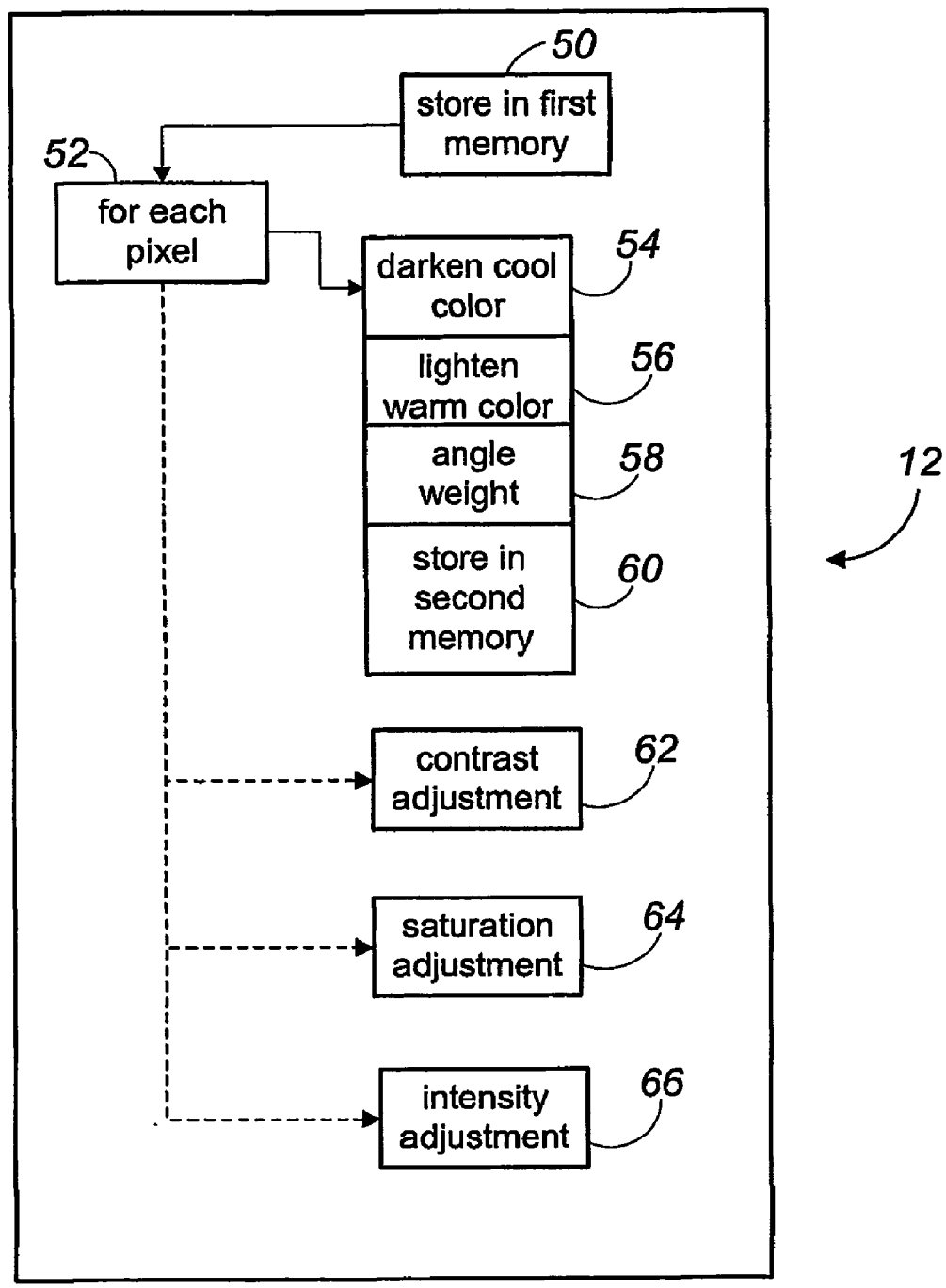
FIG. 3 is a flowchart of the method according to the present invention.

With reference to FIG. 3, after the step 50 of storing input matrix 14 in first memory 18, the invention proceeds with an adjustment of each pixel of the selection according to whether the pixel displays as a warm or cool color. The vocabulary or warm versus cool colors is well understood to those skilled in the art with reference to this disclosure, and in general the colors red, orange, yellow are consider to be warm, and blue, cyan and adjacent colors on the standard color wheel are considered to be cool.

The difference between warm and cool colors can also be referred to as the "color temperature", although it will be known to those skilled in the art that higher color temperatures actually correspond to cooler colors, while lower color temperatures correspond to warmer colors.

In step 54 the method darkens all pixels that are cool, i.e., pixels the color of which are identical or close to blue or cyan. Optionally and preferably, step 56 is added in which all pixels that are warm are lightened, i.e., colors that are identical or close to red, orange and yellow. It thus can be seen that this has the effect of increasing the contrast between cool and warm colors. This can be either by simply darkening the cool colors in the image, or as noted, optionally and preferably by also lightening the warm colors. Step 54, and optional step 56, are repeated for all pixels to be processed, as shown in step 52.

Figure 4:
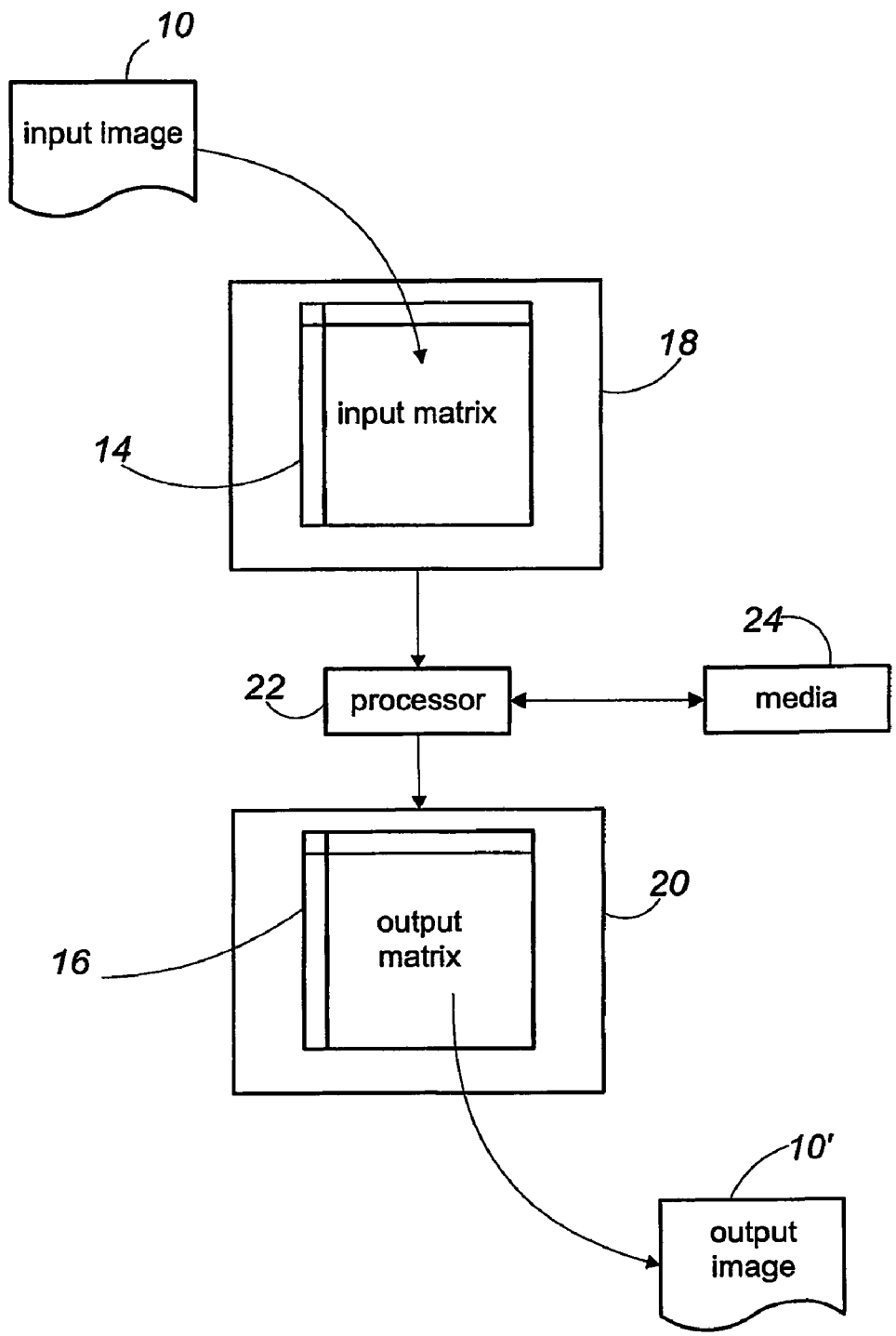
FIG. 4 is a block diagram of the structure of the digital polarizing filter of the present invention.

As shown in block form in FIG. 4, a processor 22 is used to perform the method 12, and as will be evident to those skilled in the art with reference to this disclosure, this can be any computer-based information handling system capable of interfacing and being in communication with a memory, and invoking the program instructions which may be stored on a computer readable medium 24 having contents for causing the computer-based information handling system to perform method 12.

It is possible to implement this step in any color space, and an embodiment in RGB will be described. It will be evident to those skilled in the art with reference to this disclosure how to implement this step in other color spaces, such as Lab, HSB or CMYK. Exemplary implementation in Lab will also be described.

The Lab color model, also referred to as CIE L*a*b, consists of a luminance or lightness component (L) and two chromatic components: the a component (from green to red) and the b component from blue to yellow. In one implementation of Lab mode in an image processing program, the lightness component L can range from 0 to 100 (higher values being lighter) and the a component and b component can range from +127 to −128. Other implantations of Lab mode can be constructed, and in the formulas presented herein it is assumed that L is provided as common 8 bit values ranging from 0 to 255, and where the value of 128 in the a and b channel represent zero saturation, or neutral gray.

Step 54 and step 56 are performed as follows. An intermediate pixel p is calculated for each pixel $I_{xy}$ in the input matrix 14. First, a second luminance h is calculated for the pixel. Preferably this will be the average luminance, averaged over the luminance for each of the three color channels:

$$h = (I_{xy,r} + I_{xy,g} + I_{xy,b})/3 \qquad \text{(Eq. 1)}.$$

Next, the "warm" luminance of the pixel must be assigned to a parameter h'. In one embodiment, the red channel luminance is simply assigned to parameter h':

$$h' = I_{xy,r} \qquad \text{(Eq. 2)}.$$

It will be evident that other equations could be substituted, so long as parameter h' represents a "warm" luminance.

In Lab mode, the second luminance will preferably be the pixel luminance L, and the "warm" luminance can be found by a variety of methods. A suitable approach is to replace Equation 1 with Equation 3, and Equation 2 with Equation 4, where as noted above, L is provided as common 8 bit values ranging from 0 to 255, and where the value of 128 in the a and b channel represent zero saturation, or neutral gray:

$$h = L \qquad \text{(Eq. 3)}.$$

$$h' = L + b - 128 \qquad \text{(Eq. 4)}.$$

It will be evident that h' will therefore exceed the second luminance h if warm colors predominate in the pixel, e.g., if the warm luminance exceeds the average luminance. Conversely, h' will be less than the second luminance if warm colors do not predominate in the pixel, e.g., if cool colors predominate. Equation 2 and Equation 4, in which h' is set to the luminance of the warm color component is therefore the key of the invention. By introducing a new luminosity parameter h', which equals the warm luminance (specifically the red channel luminance in RGB mode), every pixel the color of which is blue or cyan (regarded on the color hue circle) or close to blue or cyan in the original image can be darkened, step 54, and optionally and preferably, everything that is opposed to blue or cyan (such as orange and red) will be lightened, step 56.

This invention is based on the fact that in outdoor scenarios, where a polarizer is typically used, everything that is supposed to be most affected by use of a polarizing filter is blue, since the sky, and wherever it casts reflections, is blue. Also, in outdoor photography, nothing else but the sky and its reflections are blue or cyan, with some very few exceptions. That is why creating a "warm" luminosity h' with the result that cool (e.g., blue) objects are darkened, and warm (e.g., opposed-to-blue) objects aren't, does such a good job in simulating polarizing an image.

Simply assigning the red channel's luminance value to h' (in RGB color mode) is one possible and effective embodiment, but any other calculation for h' that results in a lower luminosity for "cold colors" or "colors that have the sky's color" (such as blue and cyan) and a higher luminosity for warm colors (red, orange, yellow) lead to good results. Various implementations for this will now be evident to those skilled in the art with reference to this disclosure.

In another embodiment, the user may be given control over which exact cool color hue (e.g., which blue or cyan) will be darkened most. In a further embodiment, the lightening of warm colors does not necessarily need to take place with the same strength as the darkening of the cool colors is applied.

In a simple embodiment it would be possible to only offer the user the maximum polarization effect, e.g., simply process using h'. This is not preferable, however, since to simulate the use of a polarizing filter by a photographer some mechanism should be introduced that simulates the gradual strengthening of the effect due to rotation of the filter. Preferably this is done, regardless of the color space, in step 58 by introducing an angle weighted luminance h". To simulate the effect of rotation, a linear function symmetric about 90 degrees, where θ is expressed in degrees between 0 and 180, can be used. Preferably h" will be equal to h' at 90 degrees, and h" will be equal to h at 0 degrees and 180 degrees. In other words, at a rotation angle θ near zero degrees or 180 degrees, preferably h" will differ little from the second luminance h (preferably the average luminance), and at a rotation angle θ near 90 degrees, h" will differ little from the "warm" luminance. One suitable formula is:

$$h''=1/90*((90-|\theta-90|)*h'+|\theta-90|*h) \quad \text{(Eq. 5)}.$$

In step 58 the darkening or optional lightening may now be applied, based upon the relationship of h" to h (or h' to h if no rotation simulation is being used.)

Any transformation may be used that at a minimum darkens cool colors, and optionally but preferably lightens warm colors. This can be achieved in Lab mode very simply by setting the luminance to h" and maintaining the a and b components, as shown in Equation 6, Equation 7, and Equation 8:

$$p,L=h'' \quad \text{(Eq. 6)}.$$

$$p,a=I_{xy,a} \quad \text{(Eq. 7)}.$$

$$P,b=I_{xy,b} \quad \text{(Eq. 8)}.$$

Likewise in RGB, the new luminance h" may be assigned to the pixel p. In other words, if the pixel $I_{xy}$ has luminance h, then pixel p has the luminance h". You can achieve this simply by the formula shown in Equation 9 through Equation 11:

$$p,r=I_{xy,r}+[h''-h] \quad \text{(Eq. 9)}.$$

$$p,g=I_{xy,g}+[h''-h] \quad \text{(Eq. 10)}.$$

$$p,b=I_{xy,b}+[h''-h] \quad \text{(Eq. 11)}.$$

As explained, for a warm color h" will be greater than the second luminance, and these equations will have a higher value than the initial luminance, e.g., the color is lightened. For a cool color h" will be less than the second luminance, and these equations will have a lower value than the initial luminance, e.g., the color is darkened.

Other transformations are possible, within the stated constraints. In one preferred embodiment, it is possible to adjust these equations to yield more natural colors. For example, in RGB mode it is possible to test whether h" is greater than h. If it is, that is when warm colors predominate in the pixel, for each pixel $I_{xy}$ in the input matrix 14 the following transformation formulas Equation 12 through Equation 14 may be applied in place of Equation 9 through Equation 11 when h" is greater than h:

$$p,r=([I_{xy,r}*h''/h]+I_{xy,r}+[h''-h])/2 \quad \text{(Eq. 12)}.$$

$$p,g=([I_{xy,g}*h''/h]+I_{xy,g}+[h''-h])/2 \quad \text{(Eq. 13)}.$$

$$p,b=([I_{xy,b}*h''/h]+I_{xy,b}+[h''-h])/2 \quad \text{(Eq. 14)}.$$

Conversely, for each pixel $I_{xy}$ in the input matrix 14, when h" is less than h, that is when cool colors predominate in the pixel, the following transformation formulas Equation 15 through Equation 17 may be applied in place of Equation 9 through Equation 11:

$$p,r=(255-(255-I_{xy,r})*h''/h+I_{xy,r}+[h''-h])/2 \quad \text{(Eq. 15)}.$$

$$p,g=(255-(255-I_{xy,g})*h''/h+I_{xy,g}+[h''-h])/2 \quad \text{(Eq. 16)}.$$

$$p,b=(255-(255-I_{xy,b})*h''/h+I_{xy,b}+[h''-h])/2 \quad \text{(Eq. 17)}.$$

The transformation now yields a simulated polarization effect on the image. Which ever transformation is used, it is preferable to store 60 the new value for the transformed pixel into output matrix 16 in second memory 20, so that further adjustments may be made on the image to enhance the simulation, or to permit reversal of the transformation without destruction of the input matrix 14.

Contrast Adjustment

In a further embodiment, one or more further adjustments may be made in contrast, saturation, or intensity of filter. In one further embodiment using an additional adjustment in the image's contrast, in step 62 lighter colors, that is lighter than gray, especially colors closer to white, are lightened and darker colors, that is darker than gray, especially colors close to black, are darkened.

In this embodiment, a further modification is made to p by creating a second intermediate pixel p'. In Lab mode this can be accomplished by using Equations 18 through Equation 20:

$$p',L=(p,L*x)-y \quad \text{(Eq. 18)}.$$

$$p',a=p,a \quad \text{(Eq. 19)}.$$

$$p',b=p,b \quad \text{(Eq. 20)}.$$

Or, in RGB mode using Equations 21 through Equation 23:

$$p',r=(p,r*x)-y \quad \text{(Eq. 21)}.$$

$$p',g=(p,g*x)-y \quad \text{(Eq. 22)}.$$

$$p',b=(p,b*x)-y \quad \text{(Eq. 23)}.$$

This linear transformation decreasing the color values will result in more pleasing tones after the luminance transformation described above. Values of x ranging from about 1 to about 2, preferably in the range of about 1.0 to about 1.2 and for y ranging from about 5 to about 15, preferably in the range of about 9 to about 11 yield satisfactory results.

Saturation Adjustment

In another further embodiment using an additional adjustment, in step 64 the saturation of each pixel may be increased slightly, without significantly affecting the pixel's luminance. This can be done effectively by averaging over the luminances. One way is to calculate a new pixel p" out of p' by the following method:

$$p'',r = L + (p',r - L)*w \quad \text{(Eq. 24)}.$$

$$p'',g = L + (p',g - L)*w \quad \text{(Eq. 25)}.$$

$$p'',b = L + (p',b - L)*w \quad \text{(Eq. 26)}.$$

where L is the average luminance of the intermediate pixel p':

$$L = (p',r + p',g + p',b)/3 \quad \text{(Eq. 27)}.$$

and w is a weighting factor.

For Lab mode, the averaging can be done with Equation 28 through Equation 30 in place of Equation 24 through Equation 27:

$$p'',L = p',L \quad \text{(Eq. 28)}$$

$$p'',a = 128 + (p',a - 128)*w' \quad \text{(Eq. 29)}.$$

$$p'',b = 128 + (p',a - 128)*w' \quad \text{(Eq. 30)}.$$

The value for w or w' may range from 0 to any number. A value of 1 will result in no adjustment, values of more than 1 will increase the saturation. Values for w or w' ranging between about 1.0 and 1.4, preferably in the range of about 1.05 to about 1.20 have proven to be most realistic. In practice, w' may be very slightly higher than w if the contrast adjustment step 62 has been done as described above, since the contrast adjustment step 62 has no effect upon saturation in Lab mode, while there is a slight effect upon saturation in RGB mode.

Intensity Adjustment

In a still further embodiment, in step 66 an intensity parameter i measured in percentage units may be used to permit the user to vary the effect of the prior calculations. Typically, i ranges from 0 to 200%. Various implementations will be evident, and it is not color space dependent. The result p" is weighted by i and added to the destination pixel $I'_{xy}$ by the following method (for RGB):

$$I'_{xy,r} = (p'',r - I_{xy,r})*i + I_{xy,r} \quad \text{(Eq. 31)}.$$

$$I'_{xy,g} = (p'',g - I_{xy,g})*i + I_{xy,g} \quad \text{(Eq. 32)}.$$

$$I'_{xy,b} = (p'',b - I_{xy,b})*i + I_{xy,b} \quad \text{(Eq. 33)}.$$

Likewise the following method can be used for Lab, and similar equations can be used for other color modes:

$$I'_{xy,r} = (p'',L - I_{xy,L})*i + I_{xy,L} \quad \text{(Eq. 34)}.$$

$$I'_{xy,g} = (p'',a - I_{xy,a})*i + I_{xy,a} \quad \text{(Eq. 35)}.$$

$$I'_{xy,b} = (p'',b - I_{xy,b})*i + I_{xy,b} \quad \text{(Eq. 36)}.$$

As can be seen, it is important to have saved the initial values of $I_{xy}$ in the input matrix 14 in first memory 18, so that this adjustment can be carried out.

In doing so, care must be taken to ensure that the minimum of 0 and maximum of 255 for the resulting pixel $I'_{xy}$ are not exceeded. Choosing a value of 0% for i will result in no adjustment to the initial image. It will be evident to those skilled in the art that values of i can be used exceeding 100%.

Figure 2:
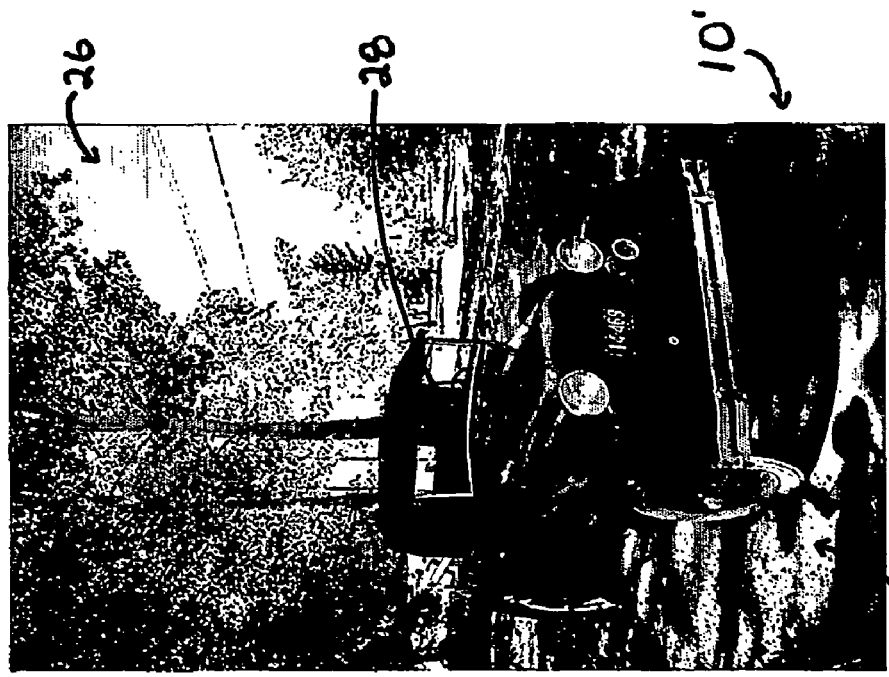
FIG. 2 is the digital image of FIG. 1. after application of the digital polarization filter according to the present invention.

At this point, with reference to FIG. 2, after application of the invention, digital image 10' looks like it was taken through a physical polarization filter, with darker sky area 26, lessening of some surface reflection 28, and lightening of warm tone ground area 30.

Although the present invention has been discussed in considerable detail with reference to certain preferred embodiments, other embodiments are possible. Therefore, the scope of the appended claims should not be limited to the description of preferred embodiments contained in this disclosure. Other embodiments of the invention are possible, and if you are working on 16 bit images, simply multiply all instances of addends and subtrahends with 256 in the above description, and wherever the byte's borders of 0 and 255 are mentioned, replace them with 0 and 65535.

In the Warm/Cool Color Contrast Adjustment, no changes need to be made for 16 bit images. In the Contrast Adjustment, while x remains unmodified, replace y with a ranges from 1250 to 3750, preferably 2300 to 2800. In the Saturation Adjustment, everything, including w and w' remains unmodified for 16 bit images, except the byte's bounds are now 0 to 65535. Intensity Adjustment remains unmodified as well. It is not possible to apply this procedure to grayscale images.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent or similar purpose, unless expressly stated otherwise. Thus, unless expressly stated otherwise, each feature disclosed is one example only of a generic series of equivalent or similar features.

This invention is not limited to particular hardware described herein, and any hardware presently existing or developed in the future that permits processing of digital images using the method disclosed can be used, including for example, a digital camera system.

Any currently existing or future developed computer readable medium suitable for storing data can be used, including, but not limited to hard drives, floppy disks, digital tape, flash cards, compact discs, and DVDs. The computer readable medium can comprise more than one device, such as two linked hard drives, in communication with the processor.

Also, any element in a claim that does not explicitly state "means for" performing a specified function or "step for" performing a specified function, should not be interpreted as a "means" or "step" clause as specified in 35 U.S.C. § 112.

What is claimed is:

1. A method for simulating in a digital image the effect of a polarization filter, the digital image having a first plurality of pixels each with a first color temperature and a second plurality of pixels each with a second color temperature, comprising the steps of:

decreasing the luminance of at least one pixel of the first plurality of pixels as a function of the first color temperature, and increasing the luminance of at least one pixel of the second plurality of pixels as a function of the second color temperature in order to simulate in the digital image the effect of the polarization filter.

2. The method of claim 1, further comprising the step of applying one or more than one adjustment algorithm chosen from the group consisting of contrast adjustment, saturation adjustment, and intensity adjustment.

3. A method for simulating in a digital image the effect of a polarization filter, the digital image having a first plurality of pixels each with a first color temperature and a second plurality of pixels each with a second color temperature, comprising steps for:

decreasing the luminance of at least one pixel of the first plurality of pixels as a function of the first color temperature and, increasing the luminance of at least one pixel of the second plurality of pixels as a function of the second color temperature in order to simulate in the digital image the effect of the polarization filter.

4. A method for simulating in a digital image the effect of a polarization filter at a rotation angle $\theta$, comprising the steps of:

a) storing the digital image in a first memory, the digital image comprising a plurality of pixels each having a pixel luminance and a color temperature;

(b) transforming each of the plurality of pixels by changing the pixel luminance as a function of the rotation angle $\theta$, and the color temperature in order to simulate in the digital image the effect of the polarization filter; and (c) storing each of the transformed pixels into a second memory.

5. The method of claim 4, wherein the transforming step further comprises decreasing the pixel luminance of pixels having cool color temperature as a function of that color temperature and increasing the pixel luminance of pixels having warm color temperature as a function of that color temperature.

6. The method of claim 5, further comprising the step of adjusting the transformation by applying one or more than one adjustment algorithm chosen from the group consisting of contrast adjustment saturation adjustment, and intensity adjustment.

7. A method for simulating in a digital image the effect of a polarization filter at a rotation angle $\theta$, comprising the steps of:

(a) storing an RGB copy of the digital image in a first memory, the digital image comprising a plurality of pixels each having a first pixel luminance and color channel luminances comprising a first red channel luminance, a first green channel luminance, and a first blue channel luminance;

(b) transforming one or more than one of the color channel luminances of each of the plurality of pixels in order to simulate in the digital image the effect of the polarization filter, the transformation comprising the steps of:

(1) calculating a second pixel luminance from the first red channel luminance;

(2) calculating an angle weighted pixel luminance from the first pixel luminance, the second pixel luminance, and rotation angle $\theta$, and (3) calculating a second blue channel luminance from the angle weighted pixel luminance, the first pixel luminance, and the first blue channel luminance; and (c) storing in a second memory, for each of the plurality of pixels, the color channel luminances including the one or more than one transformed color channel luminances.

8. The method of claim 7 wherein the second pixel luminance is an average of the color channel luminances.

9. The method of claim 7 wherein the transforming step further comprises the steps of transforming the first green channel luminance of each of the plurality of pixels by calculating a second green channel luminance from the angle weighted pixel luminance, the first pixel luminance, and the first green channel luminance; and transforming the first red channel luminance of each of the plurality of pixels by calculating a second red channel luminance from the angle weighted pixel luminance, the first pixel luminance, and the first red channel luminance.

10. The method of claim 7, wherein the step of calculating an angle weighted pixel luminance comprises the formula $h''=1/90*((90-|\theta-90|)*h'+|\theta-90|*h)$, where $h''$ is the angle weighted pixel luminance, $h'$ is the second pixel luminance and $\theta$ is expressed in degrees ranging from 0 to 180.

11. The method of claim 7, wherein the step of calculating a second blue channel luminance comprises the formula $p,b=([I_{xy,b}*h''/h]+I_{xy,b}+[h''-h])/2$, where $p,b$ is the second blue channel luminance, $h''$ is the angle weighted pixel luminance, $h$ is the first pixel luminance, and $I_{xy,b}$ is the first blue channel luminance.

12. The method of claim 7, further comprising the step of adjusting the transformation of the color channel luminances by applying one or more than one algorithm chosen from the group consisting of contrast adjustment, saturation adjustment, and intensity adjustment.

13. A computer readable medium having contents for causing a computer-based information handling system to perform steps for simulating in a digital image the effect of a polarization filter at a rotation angle $\theta$, the steps comprising:

(a) storing the digital image in a first memory, the digital image comprising a plurality of pixels each having a pixel luminance and a red channel luminance, a green channel luminance, and a blue channel luminance;

(b) transforming each of the plurality of pixels by changing the pixel luminance as a function of the rotation angle $\theta$ and the red channel luminance for simulating in the digital image the effect of the polarization filter; and (c) storing each of the transformed pixels into a second memory.

14. A computer readable medium having contents for causing a computer-based information handling system to perform steps for simulating in a digital image the effect of a polarization filter at a rotation angle $\theta$, the steps comprising:

(a) storing an RGB copy of the digital image in a first memory, the digital image comprising a plurality of pixels each having a first pixel luminance and color channel luminances comprising a first red channel luminance, a first green channel luminance, and a first blue channel luminance;

(b) transforming one or more than one of the color channel luminances of each of the plurality of pixels for simulating in a digital image the effect of a polarization filter at a rotation angle $\theta$, the transformation comprising the steps of:

(1) calculating a second pixel luminance from the first red channel luminance;

(2) calculating an angle weighted pixel luminance from the first pixel luminance, the second pixel luminance, and rotation angle $\theta$, and (3) calculating a second blue channel luminance from the angle weighted pixel luminance, the first pixel luminance, and the first blue channel luminance; and (c) storing in a second memory, for each of the plurality of pixels, the color channel luminances including the one or more than one transformed color channel luminances.

15. A computer readable medium having contents for causing a computer-based information handling system to perform steps for simulating in a digital image the effect of a polarization filter, the digital image having a first plurality of pixels each with a first color temperature and a second plurality of pixels each with a second color temperature, comprising the steps of:
decreasing the luminance of at least one pixel of the first plurality of pixels as a function of the first color temperature and increasing the luminance of at least one pixel of the second plurality of pixels as a function of the second color temperature in order to simulate in the digital image the effect of the polarization filter.

16. A computer readable medium having contents for causing a digital camera system to perform steps for simulating in a digital image the effect of a polarization filter, the digital image having a first plurality of pixels each with a first color temperature and a second plurality of pixels each with a second color temperature, comprising the steps of:
decreasing the luminance of at least one pixel of the plurality of pixels as a function of the first color temperature and increasing the luminance of at least one pixel of the second plurality of pixels as a function of the second color temperature in order to simulate in the digital image the effect of the polarization filter.

17. A digital polarizing filter for simulating in a digital image the effect of a polarization filter at a rotation angle θ, the digital image having a first plurality of pixels each with a first color temperature and a second plurality of pixels each with a second color temperature, comprising:
a processor,
a memory in communication with the processor, and
a computer readable medium in communication with the processor, the computer readable medium having contents for causing the processor to perform the steps of decreasing the luminance of at least one pixel each of the first plurality of pixels as a function of the first color temperature, and increasing the luminance of at least one pixel of the second plurality of pixels as a function of the second color temperature in order to simulate in the digital image the effect of the polarization filter.

18. The method of claim 3, further comprising the step for applying one or more than one adjustment algorithm chosen from the group consisting of contrast adjustment and saturation adjustment.

19. The filter of claim 17, the computer readable medium further having contents to perform the step of applying one or more than one adjustment algorithm chosen from the group consisting of contrast adjustment and saturation adjustment.

20. The method of claim 1, where the first color temperature is a cool color temperature and the second color temperature is a warm color temperature.

21. The filter of claim 17, where the first color temperature is a cool color temperature and the second color temperature is a warm color temperature.

* * * * *